United States Patent
Hayashi

(10) Patent No.: US 10,233,113 B2
(45) Date of Patent: Mar. 19, 2019

(54) GLASS SUBSTRATE

(71) Applicant: Nippon Electric Glass Co., Ltd., Shiga (JP)

(72) Inventor: Masahiro Hayashi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 15/556,067

(22) PCT Filed: Mar. 3, 2016

(86) PCT No.: PCT/JP2016/056619
§ 371 (c)(1),
(2) Date: Sep. 6, 2017

(87) PCT Pub. No.: WO2016/143665
PCT Pub. Date: Sep. 15, 2016

(65) Prior Publication Data
US 2018/0044223 A1    Feb. 15, 2018

(30) Foreign Application Priority Data

Mar. 10, 2015 (JP) ................... 2015-046781
Apr. 6, 2015 (JP) ................... 2015-077349

(51) Int. Cl.
*C03C 3/097* (2006.01)
*C03C 3/087* (2006.01)
*C03C 3/093* (2006.01)
*C03B 17/06* (2006.01)

(52) U.S. Cl.
CPC .............. *C03C 3/093* (2013.01); *C03C 3/087* (2013.01); *C03C 3/097* (2013.01); *C03B 17/064* (2013.01)

(58) Field of Classification Search
CPC .......... C03C 3/097; C03C 3/085; C03C 3/087
See application file for complete search history.

(56) References Cited

U.S. PATENT DOCUMENTS

| | | |
|---|---|---|
| 2013/0029830 A1 | 1/2013 | Koyama et al. |
| 2014/0049708 A1 | 2/2014 | Murata et al. |
| 2014/0249019 A1 | 9/2014 | Koyama et al. |

FOREIGN PATENT DOCUMENTS

| | | | | |
|---|---|---|---|---|
| JP | 2002003240 A | * | 1/2002 | ............. C03C 3/091 |
| JP | 3804112 | | 8/2006 | |
| JP | 2012-121738 | | 6/2012 | |
| JP | 2012184146 A | * | 9/2012 | ............. C03C 3/091 |
| JP | 2012-236759 | | 12/2012 | |
| JP | 2016-5999 | | 1/2016 | |
| WO | 2013/005679 | | 1/2013 | |

OTHER PUBLICATIONS

International Search Report dated Apr. 19, 2016 in International Application No. PCT/JP2016/056619.
International Preliminary Report on Patentability dated Sep. 12, 2017 in International Application No. PCT/JP2016/056619.

* cited by examiner

*Primary Examiner* — Karl E Group
(74) *Attorney, Agent, or Firm* — Wenderoth, Lind & Ponack, L.L.P.

(57) ABSTRACT

A technical object of the present invention is to devise an alkali-free glass that has a high etching rate in a HF-based chemical and a high strain point while having excellent productivity (particularly, devitrification resistance), to thereby reduce the production cost of a glass substrate, and then increase thinning efficiency and reduce the thermal shrinkage of the glass substrate in a production process of a display panel. In order to achieve the above-mentioned object, a glass substrate of the present invention includes as a glass composition, in terms of mol %, 65% to 75% of $SiO_2$, 11% to 15% of $Al_2O_3$, 0% to 5% of $B_2O_3$, 0% to 5% of MgO, 0% to 10% of CaO, 0% to 5% of SrO, 0% to 6% of BaO, and 0.01% to 5% of $P_2O_5$, and has a molar ratio (MgO+CaO+SrO+BaO)/$Al_2O_3$ of from 0.7 to 1.5.

12 Claims, No Drawings

GLASS SUBSTRATE

TECHNICAL FIELD

The present invention relates to a glass substrate, and more specifically, to a glass substrate suitable as a substrate for an OLED display or a liquid crystal display. More particularly, the present invention relates to a glass substrate suitable as a substrate for a display driven by an oxide TFT or a low-temperature p-Si•TFT (LTPS).

BACKGROUND ART

A glass has hitherto been widely used as a substrate for a flat panel display, such as a liquid crystal display, a hard disk, a filter, a sensor, or the like. In recent years, in addition to a conventional liquid crystal display, an OLED display has been actively developed by virtue of its self-luminescence, high color reproducibility, wide viewing angle, high-speed response, high definition, and the like. Some of the developed OLED displays have already been put to practical use. Meanwhile, a liquid crystal display or an OLED display for a mobile device, such as a smartphone, requires a screen with ultra-high definition because the display has a small area but needs to display a lot of information. The display also requires high-speed response because a moving image is displayed thereon.

In such application, an OLED display or a liquid crystal display driven by a LIPS is suitable. The OLED display emits light when a current flows through an OLED element serving as a constituent of a pixel. Therefore, a material exhibiting low resistance and a high electron mobility is used as a drive TFT element. As such material, an oxide TFT formed typically of indium gallium zinc oxide (IGZO) has attracted attention, aside from the above-mentioned LIPS. The oxide TFT has low resistance, a high mobility, and can be formed at relatively low temperature. The conventional p-Si•TFT, in particular the LIPS, is liable to have variations in TFT characteristics upon its formation on a large-size glass substrate, owing to instability of an excimer laser to be used in polycrystallization of an amorphous Si (a-Si) film. Therefore, in a TV application or the like, display unevenness is liable to occur in a screen. In contrast, the oxide TFT is excellent in homogeneity of TFT characteristics upon its formation on a large-size glass substrate. Therefore, the oxide TFT has attracted attention as a potential TFT formation material, and some of the oxide TFTs have already been put to practical use.

A glass substrate to be used for a high-definition display is required to have various characteristics. In particular, the glass substrate is required to have the following characteristics (1) to (4).

(1) To contain an alkaline component (in particular, a Li component or a Na component) at a low content or be substantially free of the alkaline component, because an alkali ion is diffused during heat treatment into a semiconductor substance having been formed into a film and causes degradation in the characteristics of the film when the glass substrate contains the alkaline component at a high content.

(2) To undergo less thermal shrinkage, in particular have a high strain point, because the glass substrate is subjected to heat treatment at several hundred degrees C. in steps of film formation, annealing, and the like, and hence a pattern shift or the like is liable to occur when the glass substrate undergoes thermal shrinkage during the heat treatment.

(3) To have a thermal expansion coefficient close to that of a film member to be formed on the glass substrate (for example, of a-Si or p-Si), for example, have a thermal expansion coefficient of from $30 \times 10^{-7}/°$ C. to $45 \times 10^{-7}/°$ C. A thermal expansion coefficient of $40 \times 10^{-7}/°$ C. or less improves thermal shock resistance as well.

(4) To have a high Young's modulus (or a high specific Young's modulus) in order to suppress failures attributed to the deflection of the glass substrate.

The glass substrate is also required to have the following characteristics (5) and (6) from the viewpoint of manufacturing the glass substrate.

(5) To have excellent meltability in order to prevent melt defects, such as bubbles, stones, and cords.

(6) To have excellent denitrification resistance in order to prevent devitrified foreign matter from being mixed in.

CITATION LIST

Patent Literature 1: JP 3804112 B2

SUMMARY OF INVENTION

Technical Problem

Meanwhile, in general, chemical etching for a glass substrate is employed in order to reduce the thickness of the display. This method involves immersing a display panel obtained by bonding two glass substrates in a hydrofluoric acid (HF)-based chemical to reduce the thicknesses of the glass substrates.

However, related-art glass substrates have a problem of a significantly low etching rate owing to high resistance to the HF-based chemical. When the concentration of HF in the chemical is increased in order to increase the etching rate, insoluble fine particles are increased in the HF-based solution. As a result, the fine particles are liable to adhere to a glass surface, and etching uniformity is impaired on the surface of the glass substrate.

In order to solve the above-mentioned problem, there has been an investigation into a method of increasing the etching rate in the HF-based chemical by reducing the content of $B_2O_3$ in a glass composition. For example, an alkali-free glass disclosed in Patent Literature 1 has a content of $B_2O_3$ of from 0 mol % to 1.5 mol %. However, the alkali-free glass disclosed in Patent Literature 1 is liable to be devitrified in its forming owing to low devitrification resistance, and is difficult to form into a flat sheet shape. In addition, it is necessary to reduce the content of $Al_2O_3$ in order to improve the devitrification resistance of the alkali-free glass, but in this case, the thermal shrinkage of a glass substrate increases in a production process of a p-Si•TFT owing to a reduction in strain point. Accordingly, it is difficult for the alkali-free glass disclosed in Patent Literature 1 to achieve a high etching rate, a high strain point, and high devitrification resistance at the same time.

Thus, a technical object of the present invention is to devise an alkali-free glass that has a high etching rate in a HF-based chemical and a high strain point while having excellent productivity (particularly, devitrification resistance), to thereby reduce the production cost of a glass substrate, and then increase thinning efficiency and reduce the thermal shrinkage of the glass substrate in a production process of a display panel.

Solution to Problem

The inventor of the present invention has repeatedly performed various experiments, and as a result, has found that the above-mentioned technical object can be achieved by strictly restricting the range of the glass composition of a $SiO_2$—$Al_2O_3$—$B_2O_3$—RO (RO represents an alkaline earth metal oxide)-based glass. Thus, the finding is proposed as the present invention. That is, firstly, according to one embodiment of the present invention, there is provided a glass substrate, which comprises as a glass composition, in terms of mol %, 65% to 75% of $SiO_2$, 11% to 15% of $Al_2O_3$, 0% to 5% of $B_2O_3$, 0% to 5% of MgO, 0% to 10% of CaO, 0% to 5% of SrO, 0% to 6% of BaO, and 0.01% to 5% of $P_2O_5$, and has a molar ratio (MgO+CaO+SrO+BaO)/$Al_2O_3$ of from 0.7 to 1.5. Herein, the "MgO+CaO+SrO+BaO" refers to the total content of MgO, CaO, SrO, and BaO. The "(MgO+CaO+SrO+BaO)/$Al_2O_3$" refers to a value obtained by dividing the total content of MgO, CaO, SrO, and BaO by the content of $Al_2O_3$.

According to investigations made by the inventor of the present invention, a high etching rate can be achieved by optimizing the contents of $SiO_2$, $Al_2O_3$, $B_2O_3$, and ROs. In addition, when the content of $B_2O_3$ is reduced in the glass composition, a strain point increases, but in the meanwhile, it becomes difficult to stabilize the glass. In view of the foregoing, in the present invention, $P_2O_5$ is introduced in the glass composition as an essential component at a content of 0.01 mol % or more, and the molar ratio (MgO+CaO+SrO+BaO)/$Al_2O_3$ is restricted to from 0.7 to 1.5. With this, the glass can be stabilized even when the content of $B_2O_3$ is reduced.

As a result, the glass substrate according to the embodiment of the present invention can achieve high devitrification resistance, a high strain point, and a high etching rate at the same time.

Secondly, it is preferred that the glass substrate according to the embodiment of the present invention satisfy a relationship of $\{2\times[SiO_2]-[MgO]-[CaO]-[SrO]-[BaO]\}\leq 133\%$ in terms of mol %. With this, the etching rate is easily increased. In addition, the acceptable introduction amount of $Al_2O_3$ can be increased, and hence the strain point is easily increased. Herein, the "[$SiO_2$]" refers to the content of $SiO_2$, the "[MgO]" refers to the content of MgO, the "[CaO]" refers to the content of CaO, the "[SrO]" refers to the content of SrO, and the "[BaO]" refers to the content of BaO. The "$\{2\times[SiO_2]-[MgO]-[CaO]-[SrO]-[BaO]\}$" refers to a value obtained by subtracting the contents of MgO, CaO, SrO, and BaO from twice the content of $SiO_2$.

Thirdly, it is preferred that the glass substrate according to the embodiment of the present invention have a content of $Li_2O+Na_2O+K_2O$ of 0.5 mol % or less in the glass composition. With this, a situation in which an alkali ion is diffused during heat treatment into a semiconductor substance having been formed into a film and causes degradation in the characteristics of the film is easily prevented. Herein, the "content of $Li_2O+Na_2O+K_2O$" refers to the total content of $Li_2O$, $Na_2O$, and $K_2O$.

Fourthly, it is preferred that the glass substrate according to the embodiment of the present invention have a content of $B_2O_3$ of 3.0 mol % or less in the glass composition.

Fifthly, it is preferred that the glass substrate according to the embodiment of the present invention have a content of $Fe_2O_3+Cr_2O_3$ of 0.02 mol % or less in the glass composition. Herein, the "content of $Fe_2O_3+Cr_2O_3$" refers to the total content of $Fe_2O_3$ and $Cr_2O_3$.

Sixthly, it is preferred that the glass substrate according to the embodiment of the present invention have a strain point of 710° C. or more. Herein, the "strain point" refers to a value measured by a method in accordance with ASTM C336.

Seventhly, it is preferred that the glass substrate according to the embodiment of the present invention have an etching depth of 25 μm or more when immersed in a 10 mass % HF aqueous solution at room temperature for 30 minutes.

Eighthly, it is preferred that the glass substrate according to the embodiment of the present invention have a Young's modulus of 75 GPa or more. Herein, the "Young's modulus" refers to a value measured by a dynamic elastic modulus measurement method (resonance method) in accordance with JIS R1602.

Ninthly, it is preferred that the glass substrate according to the embodiment of the present invention have a specific Young's modulus of 30 $GPa/(g/cm^3)$ or more. Herein, the "specific Young's modulus" is a value obtained by dividing the Young's modulus by a density.

Tenthly, it is preferred that the glass substrate according to the embodiment of the present invention be used for a liquid crystal display.

Eleventhly, it is preferred that the glass substrate according to the embodiment of the present invention be used for an OLED display.

Twelfthly, it is preferred that the glass substrate according to the embodiment of the present invention be used for a high-definition display driven by a polysilicon or oxide TFT.

Thirteenthly, according to one embodiment of the present invention, there is provided a method of producing a glass substrate which comprises as a glass composition, in terms of mol %, 65% to 75% of $SiO_2$, 11% to 15% of $Al_2O_3$, 0% to 5% of $B_2O_3$, 0% to 5% of MgO, 0% to 10% of CaO, 0% to 5% of SrO, 0% to 6% of BaO, and 0.01% to 5% of $P_2O_5$, has a molar ratio (MgO+CaO+SrO+BaO)/$Al_2O_3$ of from 0.7 to 1.5, and has a β-OH value of 0.3/mm or less, the method comprising:

a melting step of heating a blended glass batch through application of a current with a heating electrode to provide molten glass; and a forming step of forming the obtained molten glass into a glass having a flat sheet shape and having a thickness of from 0.1 mm to 0.7 mm by an overflow down-draw method.

Fourteenthly, it is preferred that the method of producing a glass substrate according to the embodiment of the present invention further comprise:

a cooling step of cooling the glass having a flat sheet shape so that a thermal shrinkage value obtained by elevating a temperature from room temperature (25° C.) up to 500° C. at a rate of 5° C./min, keeping the temperature at 500° C. for 1 hour, and dropping the temperature to room temperature at a rate of 5° C./min is 30 ppm or less.

DESCRIPTION OF EMBODIMENTS

A glass substrate of the present invention comprises as a glass composition, in terms of mol %, 65% to 75% of $SiO_2$, 11% to 15% of $Al_2O_3$, 0% to 5% of $B_2O_3$, 0% to 5% of MgO, 0% to 10% of CaO, 0% to 5% of SrO, 0% to 6% of BaO, and 0.01% to 5% of $P_2O_5$, and has a molar ratio (MgO+CaO+SrO+BaO)/$Al_2O_3$ of from 0.7 to 1.5. The reasons why the contents of the components are restricted as described above are hereinafter described. In the descriptions of the components, the expression "%" represents "mol %" unless otherwise specified.

When the content of $SiO_2$ is too small, chemical resistance, particularly acid resistance, is liable to lower, and a strain point is liable to lower. In addition, it becomes difficult to achieve a reduction in density. Further, it becomes difficult to allow two or more kinds of crystals to precipitate as an initial phase. Meanwhile, when the content of $SiO_2$ is too large, it becomes difficult to increase an etching rate. In addition, meltability is liable to lower owing to a high viscosity at high temperature. Further, a $SiO_2$-based crystal, particularly cristobalite, precipitates, and a liquidus viscosity is liable to lower. Thus, the upper limit content of $SiO_2$ is preferably 75%, 73%, 72%, or 71%, particularly preferably 70%, and the lower limit content of $SiO_2$ is preferably 65% or 67%, particularly preferably 68%. The content most preferably falls within a range of from 68% to 70%.

When the content of $Al_2O_3$ is too small, the strain point lowers, a thermal shrinkage value becomes higher, a Young's modulus lowers, and a glass substrate is liable to be deflected. In contrast, when the content of $Al_2O_3$ is too large, buffered hydrofluoric acid (BHF) resistance lowers and white turbidity is liable to occur in the surface of the glass. In addition, crack resistance is liable to lower. Further, a $SiO_2$—$Al_2O_3$-based crystal, particularly mullite, precipitates in the glass, and the liquidus viscosity is liable to lower. The upper limit content of $Al_2O_3$ is preferably 15% or 14.5%, particularly preferably 14%, and the lower limit content of $Al_2O_3$ is preferably 11% or 11.5%, particularly preferably 12%. The content most preferably falls within a range of from 12% to 14%.

When the value $\{[Al_2O_3]+2\times[P_2O_5]\}$ is restricted to a predetermined value or more, the strain point easily increases even when the content of $SiO_2$ is small. The lower limit value of $\{[Al_2O_3]+2\times[P_2O_5]\}$ is preferably 13%, 14%, or 14.5%, particularly preferably 15%. The "$[Al_2O_3]$" refers to the content of $Al_2O_3$, and the "$[P_2O_5]$" refers to the content of $P_2O_5$. The "$\{[Al_2O_3]+2\times[P_2O_5]\}$" refers to a total of the content of $Al_2O_3$ and twice the content of $P_2O_5$.

$B_2O_3$ is a component that acts as a melting accelerate component, and lowers the viscosity and enhances the meltability. The content of $B_2O_3$ is preferably from 0% to 5%, from 0% to 4%, or from 0% to 3%, particularly preferably from 0.1% to 2.5%. When the content of $B_2O_3$ is too small, $B_2O_3$ does not act sufficiently as a melting accelerate component, and the BHF resistance and the crack resistance are liable to lower. In addition, a liquidus temperature is liable to increase. In contrast, when the content of $B_2O_3$ is too large, the strain point, heat resistance, and the acid resistance, particularly the strain point, are liable to lower. In particular, when the content of $B_2O_3$ is 7% or more, such tendencies are remarkable. In addition, when the content of $B_2O_3$ is too large, the Young's modulus lowers, and the deflection amount of the glass substrate is liable to increase.

MgO is a component that enhances the meltability by lowering the viscosity at high temperature without lowering the strain point. In addition, MgO is most effective in reducing the density among ROs. However, when MgO is introduced in an excessive amount, a $SiO_2$-based crystal, particularly cristobalite, precipitates, and the liquidus viscosity is liable to lower. Further, MgO is a component that is susceptible to a reaction with BHF to form a product. There is a risk in that the reaction product may cause white turbidity in an element on the surface of the glass substrate or in the glass substrate through fixation onto the element or adhesion onto the glass substrate. Further, there is a risk in that impurities, such as $Fe_2O_3$, are mixed in the glass from introduction raw materials, such as dolomite, and thus the transmittance of the glass substrate is reduced. Therefore, the content of MgO is preferably from 0% to 5%, from 0% to 4%, from 0.1% to 4%, or from 0.5% to 3.5%, particularly preferably from 1% to 3%.

As with MgO, CaO is a component that remarkably enhances the meltability by lowering the viscosity at high temperature without lowering the strain point. However, when the content of CaO is too large, a $SiO_2$—$Al_2O_3$—RO-based crystal, particularly anorthite, precipitates, and the liquidus viscosity is liable to lower. In addition, the BHF resistance lowers, and there is a risk in that the reaction product may cause white turbidity in the element on the surface of the glass substrate or in the glass substrate through fixation onto the element or adhesion onto the glass substrate. Therefore, the upper limit content of CaO is preferably 10% or 9%, particularly preferably 8.5%, and the lower limit content of CaO is preferably 2%, 3%, 3.5%, 4%, 4.5%, 5%, 5.5%, or 6%, particularly preferably 6.5%. The content most preferably falls within a range of from 6.5% to 8.5%.

SrO is a component that enhances the chemical resistance and the devitrification resistance. However, when the ratio of SrO in all the ROs is too high, the meltability is liable to lower, and the density and a thermal expansion coefficient are liable to increase. Therefore, the content of SrO is preferably from 0% to 5%, from 0% to 4.5%, from 0% to 4%, or from 0% to 3.5%, particularly preferably from 0% to 3%.

BaO is a component that enhances the chemical resistance and the devitrification resistance. However, when the content of BaO is too large, the density is liable to increase. In addition, a $SiO_2$—$Al_2O_3$—$B_2O_3$—RO-based glass is generally hard to melt, and hence it is significantly important to enhance the meltability and reduce a defective rate attributed to bubbles, foreign matter, or the like from the viewpoint of supplying a high-quality glass substrate at low cost in large numbers. However, BaO is less effective in enhancing the meltability among the ROs. Therefore, the content of BaO is preferably from 0% to 6%, from 0% to 5%, from 0.1% to 5%, or from 0.5% to 4.5%, particularly preferably from 1% to 4%.

SrO and BaO each have the property of enhancing the crack resistance, as compared to CaO. Therefore, the content of SrO+BaO (the total content of SrO and BaO) is preferably 2% or more or 3% or more, particularly preferably more than 3%. However, when the content of SrO+BaO is too large, the density and the thermal expansion coefficient are liable to increase. Therefore, the content of SrO+BaO is preferably 9% or less, 8% or less, 7% or less, or 6% or less, particularly preferably 5.5% or less.

When two or more kinds (preferably three or more kinds) of the ROs are mixed and introduced, the liquidus temperature significantly lowers and crystalline foreign matter is hardly generated in the glass, and the meltability and formability are improved.

When the content of CaO+SrO+BaO is too large, the density increases, and it becomes difficult to achieve a reduction in weight of the glass substrate. Therefore, the content of CaO+SrO+BaO is preferably less than 15% or less than 14%, particularly preferably less than 13%. The "content of CaO+SrO+BaO" refers to the total content of CaO, SrO, and BaO.

When the molar ratio (MgO+CaO+SrO+BaO)/$Al_2O_3$ is adjusted to fall within a predetermined range, the liquidus temperature significantly lowers and crystalline foreign matter is less liable to be generated in the glass, and the meltability and the formability are improved. When the molar ratio (MgO+CaO+SrO+BaO)/$Al_2O_3$ is small, the $SiO_2$—$Al_2O_3$-based crystal easily precipitates. Meanwhile, when the molar ratio (MgO+CaO+SrO+BaO)/$Al_2O_3$ is large, the $SiO_2$—$Al_2O_3$—RO-based crystal and the $SiO_2$-based crystal easily precipitate. The upper limit value of the molar ratio (MgO+CaO+SrO+BaO)/$Al_2O_3$ is preferably 1.5, 1.4, 1.35, 1.3, 1.25, or 1.2, particularly preferably 1.18, and the lower limit value of the molar ratio (MgO+CaO+SrO+BaO)/Al$_2$O$_3$ is preferably 0.7, 0.8, 0.9, 0.95, 0.98, or 1.01, particularly preferably 1.03.

When the value {2×[SiO$_2$]−[MgO]−[CaO]−[SrO]−[BaO]} is restricted to a predetermined value or less, an etching depth in a HF aqueous solution is increased, and thus the etching rate can be easily increased. The upper limit value of {2×[SiO$_2$]−[MgO]−[CaO]−[SrO]−[BaO]} is preferably 133 mol %, 130 mol %, 128 mol %, 126 mol %, 125 mol %, or 124 mol %, particularly preferably 123 mol %.

P$_2$O$_5$ is a component that lowers the liquidus temperature for the SiO$_2$—Al$_2$O$_3$—CaO-based crystal (particularly, anorthite) and the SiO$_2$—Al$_2$O$_3$-based crystal (particularly, mullite). Therefore, when P$_2$O$_5$ is added, those crystals are difficult to precipitate when the content of SiO$_2$ is reduced, and two or more kinds of crystals easily precipitate as an initial phase. However, when P$_2$O$_5$ is introduced in a large amount, the glass is liable to undergo phase separation. Therefore, the content of P$_2$O$_5$ is preferably from 0.01% to 7%, from 0.01% to 5%, from 0.1% to 4.5%, from 0.3% to 4%, from 0.5% to 3.5%, or from 1% to 3%, particularly preferably from 1% to 2.5%.

ZnO is a component that improves the meltability and the BHF resistance. However, when the content of ZnO is too large, the glass is liable to be devitrified or the strain point lowers, with the result that it is difficult to secure the heat resistance. Therefore, the content of ZnO is preferably from 0% to 5%, particularly preferably from 0% to 1%.

ZrO$_2$ is a component that enhances chemical durability. However, when ZrO$_2$ is introduced in a large amount, devitrified foreign matter of ZrSiO$_4$ is liable to be generated. The upper limit content of ZrO$_2$ is preferably 1%, 0.5%, 0.3%, or 0.2%, particularly preferably 0.1%. It is preferred to introduce ZrO$_2$ at a content of 0.005% or more from the viewpoint of the chemical durability. The content most preferably falls within a range of from 0.005% to 0.1%. ZrO$_2$ may be introduced from a raw material or through elution from a refractory.

TiO$_2$ has an effect of enhancing the meltability by lowering the viscosity at high temperature, and also has an effect of enhancing the chemical durability. However, when TiO$_2$ is introduced in an excessive amount, an ultraviolet light transmittance is liable to lower. The content of TiO$_2$ is preferably 3% or less, 1% or less, 0.5% or less, 0.1% or less, or 0.05% or less, particularly preferably 0.03% or less. When TiO$_2$ is introduced in an extremely small amount (for example, 0.001% or more), an effect of suppressing coloration caused by ultraviolet light is obtained.

As a fining agent, there may be used As$_2$O$_3$, Sb$_2$O$_3$, SnO$_2$, SO$_3$, Fe$_2$O$_3$, CeO$_2$, F$_2$, Cl$_2$, C, metal powder, such as Al powder or Si powder, or the like. The total content of those fining agents is preferably 3% or less.

As$_2$O$_3$ and Sb$_2$O$_3$ are chemical substances of concern. Therefore, it is desired to use those substances in as small amounts as possible. Each of the contents of As$_2$O$_3$ and Sb$_2$O$_3$ is preferably less than 0.3%, less than 0.1%, less than 0.09%, less than 0.05%, less than 0.03%, less than 0.01%, or less than 0.005%, particularly preferably less than 0.003%.

SnO$_2$ has a reduction action on bubbles in the glass as a fining agent, and also has an effect of maintaining the ultraviolet light transmittance to a relatively high level when coexisting with Fe$_2$O$_3$ or FeO. However, when the content of SnO$_2$ is too large, devitrified foreign matter of SnO$_2$ is liable to be generated in the glass. The upper limit content of SnO$_2$ is preferably 0.5%, 0.4%, or 0.3%, particularly preferably 0.2%, and the lower limit content of SnO$_2$ is preferably 0.01% or 0.02%, particularly preferably 0.03%. The content most preferably falls within a range of from 0.03% to 0.2%.

Iron is a component that is mixed in from the raw material as an impurity. When the content of iron is too large, the ultraviolet light transmittance may lower. When the ultraviolet light transmittance lowers, failures may occur in a photolithography step of producing a TFT or in a step of aligning a liquid crystal by using ultraviolet light. Thus, the lower limit content of iron in terms of Fe$_2$O$_3$ is preferably 0.001%, and the upper limit content of iron in terms of Fe$_2$O$_3$ is preferably 0.01% or 0.008%, particularly preferably 0.005%. The content most preferably falls within a range of from 0.001% to 0.01%.

Cr$_2$O$_3$ is a component that is mixed in from the raw material as an impurity. When the content of Cr$_2$O$_3$ is too large, failures may occur in a foreign matter test for an internal portion of a glass substrate using scattered light from incident light entering from an end surface of the glass substrate, because the light is hard to transmit during the test. Particularly in the case where the substrate has a size measuring 730 mm×920 mm or more, such failures are more liable to occur. In addition, in the case where the glass substrate has a small thickness (for example, 0.5 mm or less or 0.4 mm or less, particularly preferably 0.3 mm or less), the restriction on the content of Cr$_2$O$_3$ is of great significance because the incident light entering from an end surface of the glass substrate is reduced. The upper limit content of Cr$_2$O$_3$ is preferably 0.001%, 0.0008%, 0.0006%, or 0.0005%, particularly preferably 0.0003%, and the lower limit content of Cr$_2$O$_3$ is preferably 0.00001%. The content most preferably falls within a range of from 0.00001% to 0.0003%.

The content of Fe$_2$O$_3$+Cr$_2$O$_3$ is preferably 120 ppm or less (0.012% or less) or 95 ppm or less (0.0095% or less), particularly preferably from 1 ppm to 90 ppm (from 0.0001% to 0.009%) from the viewpoint of a light transmitting property.

In the case where the content of SnO$_2$ is from 0.01% to 0.5%, the glass is liable to be colored when the content of Rh$_2$O$_3$ is too large. Rh$_2$O$_3$ may be mixed in from a manufacturing vessel made of platinum. The content of Rh$_2$O$_3$ is preferably from 0% to 0.0005%, more preferably from 0.00001% to 0.0001%.

SO$_3$ is a component that is mixed in from the raw material as an impurity. When the content of SO$_3$ is too large, bubbles called reboil are generated during melting and forming, and defects may occur in the glass. The upper limit content of SO$_3$ is preferably 0.005%, 0.003%, or 0.002%, particularly preferably 0.001%, and the lower limit content of SO$_3$ is preferably 0.0001%. The content most preferably falls within a range of from 0.0001% to 0.001%.

An alkaline component, particularly Li$_2$O or Na$_2$O, degrades the characteristics of various films or semiconductor elements to be formed on the glass substrate. Therefore, it is preferred to reduce the content of the alkaline component to 0.5% (desirably 0.4%, 0.3%, or 0.2%, particularly desirably 0.1%).

Components other than the above-mentioned components may be introduced. The introduction amount thereof is preferably 5% or less or 3% or less, particularly preferably 1% or less.

It is preferred that the glass substrate of the present invention have a property of allowing precipitation of two or more kinds of crystals among the SiO$_2$—Al$_2$O$_3$—RO-based crystal, the SiO$_2$-based crystal, and the SiO$_2$—Al$_2$O$_3$-based crystal within a temperature range of from the liquidus temperature to (liquidus temperature−50° C.). It is more preferred that the glass substrate of the present invention have a property of allowing precipitation of the three kinds of crystals within the temperature range. In addition, when two kinds of crystals are allowed to precipitate, it is preferred to allow precipitation of the $SiO_2$—$Al_2O_3$—RO-based crystal and the $SiO_2$-based crystal. In the vicinity of a region in which a plurality of crystal phases are in equilibrium with a liquid, the glass is stabilized, and the liquidus temperature significantly lowers. Further, when the glass allows precipitation of a plurality of those crystals around the liquidus temperature, the glass easily satisfies the above-mentioned demand characteristics (1) to (6). The "-based crystal" refers to a crystal formed of the explicit component(s).

A $SiO_2$—$Al_2O_3$—CaO-based crystal, particularly anorthite, is preferred as the $SiO_2$—$Al_2O_3$—RO-based crystal. Cristobalite is preferred as the $SiO_2$-based crystal. Mullite is preferred as the $SiO_2$—$Al_2O_3$-based crystal. When the glass allows precipitation of a plurality of those crystals around the liquidus temperature, the glass more easily satisfies the above-mentioned demand characteristics (1) to (6), particularly the demand characteristic (6), i.e., high devitrification resistance.

The glass substrate of the present invention preferably has the following characteristics.

In recent years, there is an increasing demand for achievement of a reduction in weight in a flat panel display for a mobile application, such as an OLED display or a liquid crystal display. Along with this, there is also a demand for achievement of a reduction in weight in a glass substrate. In order to satisfy such demand, the glass substrate is desirably reduced in weight by achieving a low density. The density is preferably 2.63 $g/cm^3$ or less, 2.61 $g/cm^3$ or less, 2.60 $g/cm^3$ or less, or 2.59 $g/cm^3$ or less, particularly preferably 2.58 $g/cm^3$ or less. In contrast, when the density is too low, a component balance of the glass composition may be impaired. As a result, the melting temperature is liable to increase, the liquidus viscosity is liable to lower, and productivity of the glass substrate is liable to lower. In addition, the strain point is liable to lower. Therefore, the density is preferably 2.48 $g/cm^3$ or more or 2.49 $g/cm^3$ or more, particularly preferably 2.50 $g/cm^3$ or more.

The thermal expansion coefficient is preferably from $28\times10^{-7}/°$ C. to $45\times10^{-7}/°$ C., from $30\times10^{-7}/°$ C. to $42\times10^{-7}/°$ C., or from $32\times10^{-7}/°$ C. to $42\times10^{-7}/°$ C., particularly preferably from $33\times10^{-7}/°$ C. to $41\times10^{-7}/°$ C. Such thermal expansion coefficient easily matches that of a film member to be formed on the glass substrate (for example, of a-Si or p-Si). Herein, the "thermal expansion coefficient" refers to an average thermal expansion coefficient measured in the temperature range of from 30° C. to 380° C., and may be measured with, for example, a dilatometer.

In an OLED display, a liquid crystal display, or the like, a glass substrate having a large area (for example, 730 mm×920 mm or more or 1,100 mm×1,250 mm or more, particularly 1, 500 mm×1,500 mm or more) and a glass substrate having a small thickness (for example, a thickness of 0.5 mm or less or 0.4 mm or less, particularly 0.3 mm or less) tend to be used. In such use of the glass substrate having a large area or a small thickness, there arises a significant problem of deflection due to its own weight. In order to reduce the deflection of a glass substrate, the specific Young's modulus of the glass substrate is required to be increased. The specific Young's modulus is preferably 29 $GPa/g·cm^{-3}$ or more, 30 $GPa/g·cm^{-3}$ or more, 30.5 $GPa/g·cm^3$ or more, or 31 $GPa/g·cm^3$ or more, particularly preferably 31.5 $GPa/g·cm^3$ or more. In addition, in such use of the glass substrate having a large area or a small thickness, there arises a problem of warpage of the glass substrate after a heat treatment step on a surface plate or a step of forming various metal films, oxide films, semiconductor films, organic films, and the like. In order to reduce the warpage of a glass substrate, it is effective to increase the Young's modulus of the glass substrate. The Young's modulus is preferably 73 GPa or more, 74 GPa or more, or 75 GPa or more, particularly preferably 76 GPa or more.

At present, a LTPS to be used for an ultra-high-definition mobile display offers a step at a temperature of from about 400° C. to about 600° C. In order to suppress thermal shrinkage at such temperature in the step, the strain point is preferably 700° C. or more, 710° C. or more, 720° C. or more, 730° C. or more, 740° C. or more, or 745° C. or more, particularly preferably 750° C. or more.

Recently, an OLED display has been used for a mobile application, a TV application, or the like. As a drive TFT element for those applications, an oxide TFT has attracted attention, in addition to the LIPS. The oxide TFT has hitherto been produced through a process at a temperature of from 300° C. to 400° C., which is comparable to that in the case of a-Si. However, it has been revealed that, when annealing is performed at a heat treatment temperature higher than the conventionally employed temperature, more stable element characteristics can be obtained. Such heat treatment temperature is from about 400° C. to about 600° C., and hence a glass substrate exhibiting less thermal shrinkage has been demanded also in this application.

In the glass substrate of the present invention, the thermal shrinkage value obtained by elevating the temperature from room temperature (25° C.) up to 500° C. at a rate of 5° C./min, keeping the temperature at 500° C. for 1 hour, and dropping the temperature to room temperature at a rate of 5° C./min is preferably 30 ppm or less, 25 ppm or less, 22 ppm or less, 20 ppm or less, or 18 ppm or less, particularly preferably 15 ppm or less. With such thermal shrinkage value, failures, such as a pixel pitch shift, do not easily occur even when thermal treatment is applied in manufacturing steps for a LIPS. When the thermal shrinkage value is too small, the productivity of the glass is liable to lower. Therefore, the thermal shrinkage value is preferably 5 ppm or more, particularly preferably 8 ppm or more.

The thermal shrinkage value can be reduced by increasing the entire length of a cooling furnace (annealing furnace) in a sheet-drawing direction and reducing a sheet-drawing speed in forming (forming speed), as well as by increasing the strain point. The entire length of the cooling furnace in the sheet-drawing direction is preferably 3 m or more, 5 m or more, or from 6 m to 12 m, particularly preferably from 7 m to 10 m from the viewpoint of the thermal shrinkage value. In addition, the sheet-drawing speed is preferably 8 m/min or less, or from 2 m/min to 6 m/min, particularly preferably from 3 m/min to 5 m/min.

In an overflow down-draw method, molten glass flows down along the surfaces of a wedge-shaped refractory (or a refractory coated with a platinum group metal), and the molten glasses are joined at the lower end of the wedge-shaped refractory to be formed into a glass having a flat sheet shape. In a slot down-draw method, for example, molten glass in a ribbon shape is allowed to flow down from a pipe made of a platinum group metal having a slit-shaped opening, and then cooled to be formed into a glass having a flat sheet shape. When the temperature of the molten glass brought into contact with a forming device is too high, the forming device ages, and the productivity of the glass substrate is liable to lower. Therefore, the temperature at a viscosity at high temperature of $10^{5.0}$ dPa·s is preferably 1,350° C. or less or 1,340° C. or less, particularly preferably 1,330° C. or less. Herein, the "temperature at $10^{5.0}$ dPa·s" may be measured by, for example, a platinum sphere pull up method. The temperature at a viscosity at high temperature of $10^{5.0}$ dPa·s corresponds to the temperature of molten glass at the time of forming.

The glass containing $SiO_2$, $Al_2O_3$, $B_2O_3$, and ROs in the glass composition is generally hard to melt. Therefore, the enhancement of the meltability is an issue. When the meltability is enhanced, a defective rate attributed to bubbles, foreign matter, or the like is reduced, and hence a high-quality glass substrate can be supplied at low cost in a large number. In contrast, when the viscosity of the glass in a high-temperature region is too high, removal of bubbles is less promoted in a melting step. Therefore, the temperature at a viscosity at high temperature of $10^{2.5}$ dPa·s is preferably 1,750° C. or less, 1,700° C. or less, or 1,690° C. or less, particularly preferably 1, 680° C. or less. Herein, the "temperature at $10^{2.5}$ dPa·s" may be measured by, for example, a platinum sphere pull up method. The temperature at a viscosity at high temperature of $10^{2.5}$ dPa·s corresponds to a melting temperature. As the temperature becomes lower, the meltability becomes more excellent.

In forming into a glass having a flat sheet shape by a down-draw method or the like, the devitrification resistance is important. In consideration of the forming temperature of the glass containing $SiO_2$, $Al_2O_3$, $B_2O_3$, and ROs in the glass composition, the liquidus temperature is preferably less than 1,350° C., 1,330° C. or less, 1,320° C. or less, 1,310° C. or less, or 1,300° C. or less, particularly preferably 1,290° C. or less. In addition, the liquidus viscosity is preferably $10^{4.3}$ dPa·s or more, $10^{4.8}$ dPa·s or more, $10^{5.0}$ dPa·s or more, $10^{5.2}$ dPa·s or more, $10^{5.3}$ dPa·s or more, $10^{5.4}$ dPa·s or more, or $10^{5.5}$ dPa·s or more, particularly preferably $10^{5.6}$ dPa·s or more. Herein, the "liquidus temperature" refers to a temperature at which devitrification (crystalline foreign matter) is observed in glass when glass powder that passed through a standard 30-mesh sieve (500 μm) and remained on a 50-mesh sieve (300 μm) is placed in a platinum boat and kept for 24 hours in a gradient heating furnace set to from 1,100° C. to 1,350° C., followed by taking the platinum boat out of the gradient heating furnace. The "liquidus viscosity" refers to the viscosity of glass at a liquidus temperature and may be measured by, for example, a platinum sphere pull up method.

The etching depth obtained through immersion in a 10 mass % HF aqueous solution at room temperature for 30 minutes is preferably 25 μm or more, 27 μm or more, 28 μm or more, or from 29 μm to 50 μm, particularly preferably from 30 μm to 40 μm. The etching depth serves as an indicator of an etching rate. Specifically, a large etching depth indicates a high etching rate, and a small etching depth indicates a low etching rate.

The β-OH value is preferably 0.50/mm or less, 0.45/mm or less, 0.40/mm or less, 0.35/mm or less, 0.30/mm or less, 0.25/mm or less, 0.20/mm or less, or 0.15/mm or less, particularly preferably 0.10/mm or less. The strain point can be increased by reducing the β-OH value. Meanwhile, when the β-OH value is too large, the strain point is liable to lower. When the β-OH value is too small, the meltability is liable to lower. Therefore, the β-OH value is preferably 0.01/mm or more, particularly preferably 0.05/mm or more.

A method of reducing the β-OH value is exemplified by the following methods: (1) a method involving selecting raw materials having low water contents; (2) a method involving adding a component (such as Cl or $SO_3$) that reduces the water content in the glass; (3) a method involving reducing the water content in a furnace atmosphere; (4) a method involving performing $N_2$ bubbling in the molten glass; (5) a method involving adopting a small melting furnace; (6) a method involving increasing the flow rate of the molten glass; and (7) a method involving adopting an electric melting method.

Herein, the "β-OH value" refers to a value calculated by using the following equation after measuring the transmittances of the glass with an FT-IR.

$$\beta\text{-OH value}=(1/X)\log(T_1/T_2)$$

X: Glass thickness (mm)
$T_1$: Transmittance (%) at a reference wavelength of 3,846 $cm^{-1}$
$T_2$: Minimum transmittance (%) at a wavelength around a hydroxyl group absorption wavelength of 3,600 $cm^{-1}$ The glass substrate of the present invention is preferably formed by an overflow down-draw method. As described above, the overflow down-draw method refers to a method in which molten glass is caused to overflow from both sides of a wedge-shaped refractory, and the overflowing molten glasses are subjected to down-draw downward at the lower end of the wedge-shaped refractory while being joined, to thereby form a glass having a flat sheet shape. When a glass substrate is produced by the overflow down-draw method, surfaces that are to serve as the surfaces of the glass substrate are formed in a state of free surfaces without being brought into contact with the refractory. As a result, it is possible to produce a glass substrate having good surface quality without polishing at low cost and an increase in area and a reduction in thickness are easily achieved as well. A material for the refractory to be used in the overflow down-draw method is not particularly limited as long as desired dimensions and surface accuracy can be realized. In addition, a method of applying a force to glass at the time of performing down-draw downward is also not particularly limited. For example, there may be adopted a method involving rotating a heat-resistant roll having a sufficiently large width in a state of being in contact with glass, to thereby draw the glass, or a method involving allowing a plurality of pairs of heat-resistant rolls to come into contact with only the vicinities of end surfaces of glass, to thereby draw the glass.

It is also possible to form a glass by, for example, any of other down-draw methods (such as a slot down method and a redraw method), a float method, and the like, besides the overflow down-draw method.

The thickness of the glass substrate of the present invention is not particularly limited, but is preferably 0.5 mm or less, 0.4 mm or less, or 0.35 mm or less, particularly preferably 0.3 mm or less. As the thickness becomes smaller, the weight of a device can be reduced more easily. In contrast, as the thickness becomes smaller, the glass substrate is more liable to be deflected. However, because the glass substrate of the present invention has a high Young's modulus and a high specific Young's modulus, failures attributed to deflection do not easily occur. The thickness can be adjusted by controlling, for example, the flow rate and the sheet-drawing speed at the time of glass production.

The glass substrate of the present invention is preferably used for a substrate for an OLED display. Although the OLED display is now generally commercially available, cost reduction thereof through mass production is strongly desired. The glass substrate of the present invention is excellent in productivity and can be easily increased in area or reduced in thickness, and hence can meet such demands properly.

A method of producing a glass substrate of the present invention is a method of producing a glass substrate which comprises as a glass composition, in terms of mol %, 65% to 75% of $SiO_2$, 11% to 15% of $Al_2O_3$, 0% to 5% of $B_2O_3$, 0% to 5% of MgO, 0% to 10% of CaO, 0% to 5% of SrO, 0% to 6% of BaO, and 0.01% to 5% of $P_2O_3$, has a molar ratio (MgO+CaO+SrO+BaO)/$Al_2O_3$ of from 0.7 to 1.5, and has a β-OH value of 0.3/mm or less, the method comprising: a melting step of heating a blended glass batch through application of a current with a heating electrode to provide molten glass; and a forming step of forming the obtained molten glass into a glass having a flat sheet shape and having a thickness of from 0.1 mm to 0.7 mm by an overflow down-draw method. Herein, part of the technical features of the method of producing a glass substrate of the present invention has already been described in the section of the description of the glass substrate of the present invention. Thus, the detailed description of the overlapping portions is omitted.

In general, a production process of the glass substrate comprises a melting step, a fining step, a supplying step, a stirring step, and a forming step. The melting step is a step of melting a glass batch obtained by blending glass raw materials to provide molten glass. The fining step is a step of fining the molten glass obtained in the melting step by an action of a fining agent or the like. The supplying step is a step of transferring the molten glass from one step to another. The stirring step is a step of stirring the molten glass to homogenize the molten glass. The forming step is a step of forming the molten glass into a glass having a flat sheet shape. A step other than the above-mentioned steps, for example, a state adjusting step of adjusting the molten glass to be in a state suitable for forming may be introduced after the stirring step as required.

An alkali-free glass and a low-alkali glass, which have hitherto been used, have generally been subjected to melting through heating with combustion burner flame. A burner is generally arranged at an upper portion of a melting kiln, and uses fossil fuel as its fuel, specifically, for example, liquid fuel, such as heavy oil, or gas fuel, such as LPG. The combustion flame may be obtained by mixing the fossil fuel and oxygen gas. However, such method is liable to entail an increase in β-OH value because a large amount of water is mixed in the molten glass during melting. Therefore, the method of producing a glass substrate of the present invention comprises performing heating through application of a current with a heating electrode. With this, water is less liable to be mixed in the molten glass during melting, and hence the β-OH value is easily controlled to 0.3/mm or less, particularly to 0.20/mm or less. Further, when the heating through application of a current with a heating electrode is performed, the amount of energy required for obtaining the molten glass per unit mass is reduced, and the amount of a melting volatile is reduced. As a result, an environmental load can be reduced.

The heating through application of a current with a heating electrode is preferably performed by applying an alternating voltage to a heating electrode arranged at a bottom portion or a side portion of a melting kiln so as to be brought into contact with the molten glass in the melting kiln. A material used for the heating electrode preferably has heat resistance and corrosion resistance to the molten glass, and for example, tin oxide, molybdenum, platinum, and rhodium may be used.

The alkali-free glass and the low-alkali glass, which each contain an alkali metal oxide in a small amount, have high electrical resistivity. Therefore, when the heating through application of a current with a heating electrode is applied to those glasses, there is a risk in that the current flows not only in the molten glass but also in a refractory constituting the melting kiln, resulting in early damage to the refractory. In order to prevent such situation, it is preferred to use, as a refractory in a furnace, a zirconia-based refractory having high electrical resistivity, particularly zirconia electrocast bricks. It is also preferred to introduce a component that lowers the electrical resistivity ($Li_2O$, $Na_2O$, $K_2O$, $Fe_2O_3$, or the like) in the molten glass (glass composition) at a small content, particularly $Li_2O$, $Na_2O$, and $K_2O$ at a total content of from 0.01 mol % to 1 mol %, from 0.02 mol % to 0.5 mol %, from 0.03 mol % to 0.4 mol %, from 0.05 mol % to 0.3 mol %, particularly from 0.1 mol % to 0.2 mol %. The content of $ZrO_2$ in the zirconia-based refractory is preferably 85 mass % or more, particularly preferably 90 mass % or more.

It is preferred that the method of producing a glass substrate of the present invention further comprise a cooling step of cooling the glass having a flat sheet shape so that a thermal shrinkage value obtained by elevating a temperature from room temperature (25° C.) up to 500° C. at a rate of 5° C./min, keeping the temperature at 500° C. for 1 hour, and dropping the temperature to room temperature at a rate of 5° C./rain is 30 ppm or less. A method of reducing the thermal shrinkage value of the glass substrate is as described above.

EXAMPLES

The present invention is hereinafter described in detail by way of Examples. However, Examples below are merely examples, and the present invention is by no means limited to Examples below.

Tables 1 and 2 show Examples of the present invention (Sample Nos. 1 to 26).

TABLE 1

| | | No. 1 | No. 2 | No. 3 | No. 4 | No. 5 | No. 6 | No. 7 | No. 8 | No. 9 | No. 10 |
|---|---|---|---|---|---|---|---|---|---|---|---|
| Glass composition (mol %) | $SiO_2$ | 72.98 | 71.7 | 68.9 | 67.4 | 71.39 | 70.0 | 68.6 | 67.2 | 69.76 | 68.4 |
| | $Al_2O_3$ | 11.3 | 11.5 | 11.8 | 12.0 | 12.8 | 13.0 | 13.2 | 13.3 | 14.3 | 14.5 |
| | $B_2O_3$ | 0.3 | 0.3 | 0.3 | 0.3 | 0.3 | 0.3 | 0.3 | 0.3 | 0.3 | 0.3 |
| | $MgO$ | 3.1 | 3.1 | 3.2 | 3.2 | 3.1 | 3.1 | 3.2 | 3.2 | 3.1 | 3.2 |
| | $CaO$ | 7.2 | 7.3 | 7.5 | 7.6 | 7.3 | 7.4 | 7.5 | 7.6 | 7.3 | 7.4 |
| | $SrO$ | 0.5 | 0.5 | 0.6 | 0.6 | 0.5 | 0.5 | 0.5 | 0.6 | 0.5 | 0.5 |
| | $BaO$ | 4.5 | 4.5 | 4.6 | 4.7 | 4.5 | 4.6 | 4.6 | 4.7 | 4.5 | 4.6 |
| | $P_2O_5$ | 0.02 | 1.0 | 3.0 | 4.1 | 0.01 | 1.0 | 2.0 | 3.0 | 0.04 | 1.0 |
| | $ZrO_2$ | 0.010 | 0.010 | 0.010 | 0.010 | 0.020 | 0.015 | 0.010 | 0.030 | 0.010 | 0.010 |
| | $TiO_2$ | 0.005 | 0.005 | 0.010 | 0.020 | 0.010 | 0.010 | 0.010 | 0.010 | 0.005 | 0.005 |
| | $SnO_2$ | 0.200 | 0.200 | 0.200 | 0.200 | 0.200 | 0.200 | 0.200 | 0.200 | 0.200 | 0.200 |
| | $Fe_2O_3$ | 0.007 | 0.009 | 0.009 | 0.009 | 0.009 | 0.007 | 0.009 | 0.008 | 0.006 | 0.007 |
| | $Cr_2O_3$ | 0.0001 | 0.0001 | 0.0002 | 0.0001 | 0.0001 | 0.0001 | 0.0002 | 0.0002 | 0.0001 | 0.0001 |
| | $Rh_2O_3$ | 0.00005 | 0.00005 | 0.00010 | 0.00005 | 0.00005 | 0.00005 | 0.00005 | 0.00003 | 0.00005 | 0.00005 |
| | $SO_3$ | 0.0002 | 0.0003 | 0.0003 | 0.0002 | 0.0001 | 0.0001 | 0.0002 | 0.0002 | 0.0001 | 0.0001 |
| $2*SiO_2 - \Sigma RO$ (mol %) | | 131 | 128 | 122 | 119 | 127 | 124 | 121 | 118 | 124 | 121 |
| Molar ratio | $RO/Al_2O_3$ | 1.34 | 1.34 | 1.34 | 1.34 | 1.20 | 1.20 | 1.20 | 1.20 | 1.09 | 1.09 |
| β-OH value (/mm) | | 0.15 | 0.15 | 0.15 | 0.16 | 0.17 | 0.21 | 0.20 | 0.20 | 0.19 | 0.13 |
| Density (g/cm³) | | 2.61 | 2.60 | 2.59 | 2.59 | 2.62 | 2.62 | 2.61 | 2.61 | 2.64 | 2.63 |
| Thermal expansion coefficient [30°C.-380°C.] (×10⁻⁷/°C.) | | 40 | 40 | 42 | 42 | 40 | 40 | 41 | 41 | 40 | 40 |
| Young's modulus (GPa) | | 81 | 79 | 77 | 76 | 82 | 81 | 79 | 78 | 83 | 82 |
| Specific Young's modulus (GPa/g·cm⁻³) | | 31 | 30 | 30 | 29 | 31 | 31 | 30 | 30 | 32 | 31 |
| Strain point (°C.) | | 758 | 755 | 748 | 748 | 771 | 765 | 756 | 748 | 782 | 773 |
| Softening point (°C.) | | 1,059 | 1,055 | 1,049 | 1,050 | 1,062 | 1,055 | 1,049 | 1,041 | 1,060 | 1,053 |
| Viscosity at high temperature (°C.) | $10^{2.5}$ dPa·s | 1,684 | 1,687 | 1,665 | 1,658 | 1,663 | 1,670 | 1,653 | 1,638 | 1,638 | 1,634 |
| | $10^{5.0}$ dPa·s | 1,336 | 1,332 | 1,320 | 1,315 | 1,325 | 1,324 | 1,315 | 1,304 | 1,314 | 1,307 |
| Liquidus temperature (°C.) | | 1,239 | 1,269 | 1,348 | 1,335 | 1,270 | 1,232 | — | 1,229 | 1,281 | — |
| Initial phase | | Cri, Ano | Cri | Cri | Cri | Ano | Cri | — | Cri | Ano | — |
| Liquidus viscosity log η (dPa·s) | | 5.4 | 5.0 | 4.3 | 4.3 | 5.0 | 5.3 | — | 5.2 | 4.8 | — |
| Etching depth (μm) 10% HF at 20°C. for 30 min | | 27 | 29 | 32 | 34 | 29 | 31 | 32 | 34 | 31 | 33 |
| Thermal shrinkage rate (ppm) at 500°C. for 1 hr | | 11 | 12 | 13 | 13 | <10 | <10 | 11 | 13 | <10 | <10 |

| | | No. 11 | No. 12 | No. 13 | No. 14 | No. 15 | No. 16 | No. 17 | No. 18 | No. 19 | No. 20 |
|---|---|---|---|---|---|---|---|---|---|---|---|
| Glass Composition (mol %) | $SiO_2$ | 66.9 | 69.4 | 70.9 | 70.5 | 69.25 | 70.8 | 69.9 | 67.7 | 69.5 | 69.1 |
| | $Al_2O_3$ | 14.7 | 11.5 | 12.0 | 11.8 | 12.5 | 12.8 | 13.0 | 13.2 | 13.3 | 14.3 |
| | $B_2O_3$ | 0.3 | 3.0 | 1.5 | 1.5 | 3.2 | 1.3 | 0.0 | 2.5 | 2.6 | 3.0 |
| | $MgO$ | 3.2 | 4.0 | 3.0 | 1.0 | 4.0 | 3.0 | 3.0 | 1.5 | 2.0 | 2.0 |
| | $CaO$ | 7.5 | 4.5 | 4.0 | 6.5 | 6.4 | 5.5 | 7.0 | 4.5 | 4.0 | 4.0 |
| | $SrO$ | 0.6 | 2.0 | 2.5 | 1.5 | 1.5 | 2.5 | 2.5 | 2.5 | 3.5 | 1.5 |
| | $BaO$ | 4.7 | 2.5 | 3.0 | 3.0 | 3.0 | 3.0 | 2.0 | 5.0 | 2.0 | 3.0 |
| | $P_2O_5$ | 2.0 | 3.0 | 3.0 | 4.1 | 0.05 | 1.0 | 2.0 | 3.0 | 3.0 | 3.0 |
| | $ZrO_2$ | 0.010 | 0.010 | 0.010 | 0.010 | 0.010 | 0.010 | 0.020 | 0.015 | 0.010 | 0.010 |
| | $TiO_2$ | 0.005 | 0.005 | 0.005 | 0.005 | 0.010 | 0.020 | 0.010 | 0.010 | 0.010 | 0.010 |
| | $SnO_2$ | 0.200 | 0.200 | 0.200 | 0.200 | 0.200 | 0.200 | 0.200 | 0.200 | 0.200 | 0.200 |
| | $Fe_2O_3$ | 0.008 | 0.007 | 0.009 | 0.009 | 0.009 | 0.009 | 0.009 | 0.007 | 0.009 | 0.009 |
| | $Cr_2O_3$ | 0.0001 | 0.0001 | 0.0001 | 0.0001 | 0.0002 | 0.0001 | 0.0001 | 0.0001 | 0.0002 | 0.0001 |
| | $Rh_2O_3$ | 0.00006 | 0.00005 | 0.00005 | 0.00005 | 0.00010 | 0.00005 | 0.00005 | 0.00005 | 0.00010 | 0.00005 |

TABLE 1-continued

| | | | | | | | | | | |
|---|---|---|---|---|---|---|---|---|---|---|
| SO$_3$ | 0.0003 | 0.0002 | 0.0003 | 0.0003 | 0.0003 | 0.0002 | 0.0001 | 0.0001 | 0.0003 | 0.0001 |
| 2*SiO$_2$—ΣRO (mol %) | 118 | 126 | 129 | 129 | 124 | 128 | 125 | 122 | 127 | 128 |
| Molar ratio RO/Al$_2$O$_3$ | 1.09 | 1.13 | 1.04 | 1.02 | 1.19 | 1.09 | 1.16 | 1.03 | 0.86 | 0.73 |
| β-OH value (/mm) | 0.20 | 0.16 | 0.17 | 0.21 | 0.20 | 0.21 | 0.20 | 0.19 | 0.22 | 0.19 |
| Density (g/cm$^3$) | 2.63 | 2.51 | 2.54 | 2.51 | 2.58 | 2.58 | 2.58 | 2.61 | 2.52 | 2.52 |
| Thermal expansion coefficient [30° C.-380° C.] (×10$^{-7}$/° C.) | 40 | 35 | 35 | 35 | 38 | 37 | 38 | 38 | 34 | 32 |
| Young's modulus (GPa) | 81 | 75 | 75 | 73 | 80 | 80 | 80 | 75 | 75 | 75 |
| Specific Young's modulus (GPa/g · cm$^{-3}$) | 31 | 30 | 30 | 29 | 31 | 31 | 31 | 29 | 30 | 30 |
| Strain point (° C.) | 763 | 718 | 750 | 749 | 721 | 759 | 771 | 732 | 752 | 755 |
| Softening point (° C.) | 1,046 | 1,040 | 1,070 | 1,076 | 1,012 | 1,054 | 1,058 | 1,051 | 1,069 | 1,079 |
| Viscosity at high temperature 10$^{2.5}$ dPa · s | 1,627 | 1,691 | 1,726 | 1,742 | 1,617 | 1,674 | 1,666 | 1,689 | 1,708 | 1,713 |
| 10$^{5.0}$ dPa · s | 1,301 | 1,270 | 1,304 | 1,311 | 1,224 | 1,274 | 1,275 | 1,276 | 1,297 | 1,305 |
| Liquidus temperature (° C.) | — | — | — | — | — | — | — | — | — | — |
| Initial phase | — | — | — | — | — | — | — | — | — | — |
| Liquidus viscosity logη (dPa · s) | — | — | — | — | — | — | — | — | — | — |
| Etching depth (μm) 10% HF at 20° C. for 30 min | 35 | 30 | 28 | 28 | 31 | 29 | 30 | 32 | 29 | 29 |
| Thermal shrinkage rate at 500° C. for 1 hr (ppm) | <10 | 17 | 13 | 13 | 17 | 11 | <10 | 15 | 12 | 12 |

TABLE 2

| | | No. 21 | No. 22 | No. 23 | No. 24 | No. 25 | No. 26 |
|---|---|---|---|---|---|---|---|
| Glass composition (mol %) | $SiO_2$ | 69.7 | 69.6 | 70.3 | 68.2 | 66.1 | 71.9 |
| | $Al_2O_3$ | 12.6 | 13.2 | 13.3 | 13.6 | 13.9 | 12.1 |
| | $B_2O_3$ | 1.5 | 1.5 | 1.6 | 1.6 | 1.6 | 0.3 |
| | MgO | 1.7 | 1.7 | 4.3 | 4.4 | 4.5 | 4.6 |
| | CaO | 8.6 | 8.6 | 5.6 | 5.7 | 5.8 | 5.5 |
| | SrO | 1.7 | 1.7 | 1.2 | 1.2 | 1.2 | 1.3 |
| | BaO | 2.6 | 2.6 | 3.6 | 3.7 | 3.7 | 4.2 |
| | $P_2O_5$ | 1.5 | 1.0 | 0.0 | 1.5 | 3.0 | 0.0 |
| | $ZrO_2$ | 0.010 | 0.010 | 0.010 | 0.030 | 0.010 | 0.010 |
| | $TiO_2$ | 0.005 | 0.005 | 0.010 | 0.010 | 0.005 | 0.005 |
| | $SnO_2$ | 0.200 | 0.200 | 0.200 | 0.200 | 0.200 | 0.200 |
| | $Fe_2O_3$ | 0.007 | 0.006 | 0.007 | 0.008 | 0.007 | 0.006 |
| | $Cr_2O_3$ | 0.0001 | 0.0001 | 0.0001 | 0.0001 | 0.0001 | 0.0001 |
| | $Rh_2O_3$ | 0.00005 | 0.00005 | 0.00005 | 0.00006 | 0.00005 | 0.00005 |
| | $SO_3$ | 0.0001 | 0.0001 | 0.0001 | 0.0003 | 0.0002 | 0.0003 |
| | $Li_2O$ | 0.0009 | 0.0010 | 0.0007 | 0.0010 | 0.0015 | 0.0012 |
| | $Na_2O$ | 0.0100 | 0.0200 | 0.0150 | 0.0170 | 0.0100 | 0.0220 |
| | $K_2O$ | 0.0030 | 0.0032 | 0.0040 | 0.0025 | 0.0048 | 0.0034 |
| 2*$SiO_2$—ΣRO (mol %) | | 125 | 125 | 126 | 122 | 117 | 128 |
| Molar ratio | $RO/Al_2O_3$ | 1.17 | 1.11 | 1.10 | 1.10 | 1.10 | 1.29 |
| β-OH value (/mm) | | 0.23 | 0.20 | 0.21 | 0.19 | 0.22 | 0.19 |
| Density (g/cm$^3$) | | 2.53 | 2.54 | 2.60 | 2.60 | 2.59 | 2.70 |
| Thermal expansion coefficient [30° C.-380° C.] (*10$^{-7}$/° C.) | | 36 | 36 | 37 | 38 | 38 | 42 |
| Young's modulus (GPa) | | 79 | 80 | 82 | 80 | 79 | 82 |
| Specific Young's modulus (GPa/g · cm$^{-3}$) | | 31 | 32 | 32 | 31 | 30 | 30 |
| Strain point (° C.) | | 753 | 761 | 747 | 736 | 724 | 744 |
| Softening point (° C.) | | 1,058 | 1,060 | 1,046 | 1,036 | 1,025 | 1,044 |
| Viscosity at high temperature (° C.) | $10^{2.5}$ dPa · s | 1,688 | 1,677 | 1,634 | 1,624 | 1,613 | 1,636 |
| | $10^{5.0}$ dPa · s | 1,274 | 1,271 | 1,253 | 1,243 | 1,232 | 1,300 |
| Liquidus temperature (° C.) | | 1,305 | 1,267 | 1,220 | 1,189 | 1,248 | 1,234 |
| Initial phase | | Cri | Cri, Ano | Ano | Cri | Cri | Ano |
| Liquidus viscosity log η (dPa · s) | | 4.7 | 5.0 | 5.3 | 5.6 | 4.9 | 5.1 |
| Etching depth (μm) | 10% HF at 20° C. for 30 min | 30 | 30 | 26 | 32 | 38 | 29 |
| Thermal shrinkage rate (ppm) | at 500° C. for 1 hr | 12 | 10 | 13 | 15 | 16 | 14 |

Each sample was produced in the following manner. First, a glass batch prepared by blending glass raw materials so that each glass composition listed in the tables was attained was placed in a platinum crucible, and then melted at 1,600° C. for 24 hours. When the glass batch was dissolved, molten glass was stirred to be homogenized by using a platinum stirrer. Next, the molten glass was poured on a carbon sheet and formed into a glass having a flat sheet shape. Each of the resultant samples was evaluated for its density, thermal expansion coefficient, Young's modulus, specific Young's modulus, strain point, softening point, temperature at a viscosity at high temperature of $10^{2.5}$ dPa·s, temperature at a viscosity at high temperature of $10^{5.0}$ dPa·s, liquidus temperature, initial phase, liquidus viscosity log η, and etching depth in a HF aqueous solution.

The β-OH value is a value calculated by using the above-mentioned equation.

The density is a value obtained by measurement by a well-known Archimedes method.

The thermal expansion coefficient is an average thermal expansion coefficient measured in the temperature range of from 30° C. to 380° C. with a dilatometer.

The Young's modulus refers to a value measured by a dynamic elastic modulus measurement method (resonance method) in accordance with JIS R1602, and the specific Young's modulus is a value obtained by dividing the Young's modulus by the density.

The strain point and the softening point are values obtained by measurement based on the method of ASTM C336.

The temperatures at viscosities at high temperature of $10^{2.5}$ dPa·s and $10^{5.0}$ dPa·s are values obtained by measurement by a platinum sphere pull up method.

Next, each of the samples was pulverized, and glass powder that passed through a standard 30-mesh sieve (500 μm) and remained on a 50-mesh sieve (300 μm) was placed in a platinum boat and kept for 24 hours in a gradient heating furnace set to from 1,100° C. to 1,350° C., followed by taking the platinum boat out of the gradient heating furnace. The temperature at which devitrification (crystalline foreign matter) was observed in the glass was defined as the liquidus temperature. In addition, a crystal that had precipitated in a temperature range of from the liquidus temperature to (liquidus temperature–50° C.) was evaluated as an initial phase. In the tables, the "Ano" represents anorthite, the "Cri" represents cristobalite, and the "Mul" represents mullite. Further, the viscosity of the glass at the liquidus temperature was measured by a platinum sphere pull up method and was defined as the liquidus viscosity.

Both surfaces of each sample were optically polished, and then masking was performed on part of the surface of each sample. Each sample was then immersed in a 10 mass % HF aqueous solution at room temperature for 30 minutes. After that, an etching depth was evaluated by measuring a difference in surface level between a masked portion and an etched portion on the surface of the resultant sample.

The thermal shrinkage value is a value obtained as described below. Each sample was formed into a glass having a flat sheet shape by an overflow down-draw method. In the forming, the glass was allowed to flow down in a cooling furnace having a total length of 7 m at a sheet-drawing speed controlled to 4 m/min. After that, each glass was cut into a predetermined size to provide a glass substrate. For the resultant glass substrate, the temperature was elevated from room temperature (25° C.) up to 500° C. at a rate of 5° C./min, kept at 500° C. for 1 hour, and dropped to room temperature at a rate of 5° C./min.

Each of Sample Nos. 1 to 26 has a thermal expansion coefficient of from $32 \times 10^{-7}$/° C. to $42 \times 10^{-7}$/° C., and has a strain point of 718° C. or more and hence the thermal shrinkage value can be reduced to 17 ppm or less. In addition, the Young's modulus is 73 GPa or more and the specific Young's modulus is 29 GPa/(g/cm$^3$) or more, and hence deflection and deformation are less liable to occur. In addition, the temperature at $10^{2.5}$ dPa·s is 1,742° C. or less, the temperature at viscosity at high temperature of $10^{5.0}$ dPa·s is 1,336° C. or less, the liquidus temperature is 1,348° C. or less, and the liquidus viscosity is $10^{4.3}$ dPa·s or more, and hence the meltability and the formability are excellent, and mass-production can be applied. Further, the etching depth is 27 μm or more, and hence the etching rate can be increased.

INDUSTRIAL APPLICABILITY

The glass substrate of the present invention can achieve high devitrification resistance, a high strain point, and a high etching rate at the same time. Accordingly, the glass substrate of the present invention is suitable for a display, such as an OLED display or a liquid crystal display, and particularly for a display driven by a LTPS or an oxide TFT.

The invention claimed is:

1. A glass substrate, which comprises as a glass composition, in terms of mol %, 65% to 75% of SiO$_2$, 11% to 15% of Al$_2$O$_3$, 0% to 5% of B$_2$O$_3$, 0% to 5% of MgO, 0% to 10% of CaO, 0% to 5% of SrO, 0% to 6% of BaO, and 0.01% to 5% of P$_2$O$_5$, has a molar ratio (MgO+CaO+SrO+BaO)/Al$_2$O$_3$ of from 0.7 to 1.5, and the value {[Al$_2$O$_3$]+2×[P$_2$O$_5$]} is 13 mol % or more.

2. The glass substrate according to claim 1, wherein the glass substrate satisfies a relationship of {2×[SiO$_2$]−[MgO]−[CaO]−[SrO]−[BaO]}≤133% in terms of mol %.

3. The glass substrate according to claim 1, wherein the glass substrate has a content of Li$_2$O+Na$_2$O+K$_2$O of 0.5 mol % or less in the glass composition.

4. The glass substrate according to claim 1, wherein the glass substrate has a content of B$_2$O$_3$ of 3.0 mol % or less in the glass composition.

5. The glass substrate according to claim 1, wherein the glass substrate has a content of Fe$_2$O$_3$+Cr$_2$O$_3$ of 0.02 mol % or less in the glass composition.

6. The glass substrate according to claim 1, wherein the glass substrate has a strain point of 710° C. or more.

7. The glass substrate according to claim 1, wherein the glass substrate has an etching depth of 25 μm or more when immersed in a 10 mass % HF aqueous solution at room temperature for 30 minutes.

8. The glass substrate according to claim 1, wherein the glass substrate has a Young's modulus of 75 GPa or more.

9. The glass substrate according to claim 1, wherein the glass substrate has a specific Young's modulus of 30 GPa/(g/cm$^3$) or more.

10. A liquid crystal display comprising the glass substrate according to claim 1.

11. An OLED display comprising the glass substrate according to claim 1.

12. A high-definition display driven by a polysilicon or oxide TFT comprising the glass substrate according to claim 1.

* * * * *